United States Patent

[11] 3,597,519

| [72] | Inventors | George A. Kemeny<br>Export;<br>Ronald R. Akers, Trafford, both of, Pa. |
|---|---|---|
| [21] | Appl. No. | 8,982 |
| [22] | Filed | Feb. 5, 1970 |
| [45] | Patented | Aug. 3, 1971 |
| [73] | Assignee | Westinghouse Electric Corporation<br>Pittsburgh, Pa. |

[54] MAGNETIC-FIELD ROTATING-ELECTRODE ELECTRIC ARC FURNACE APPARATUS AND METHODS
22 Claims, 6 Drawing Figs.

[52] U.S. Cl. .................................................. 13/18
[51] Int. Cl. .............................................. H05b 7/08
[50] Field of Search ........................................... 13/18, 9

[56] References Cited
UNITED STATES PATENTS
2,951,890  9/1960  Yeomans et al. ............ 13/9 X
3,461,214  8/1969  Schlienger .................... 13/18

Primary Examiner—Bernard A. Gilheany
Assistant Examiner—Roy N. Envall, Jr.
Attorneys—A. T. Stratton, C. L. McHale and M. I. Hull ABSTRACT: Magnetic field generating means sets up a field within a mold having at least partially electrically conductive material therein to form a melt, the field lines extending through at least a portion of the mold. A rotating electrode has at least the portion thereof which forms the arcing surface rotating in a predetermined plane with respect to the surface of the melt, and an arc takes place between electrode and melt. Where the mold is composed of electrically conductive material, the magnetic field stirs the melt by interaction with current filaments extending from the instant point of arc attachment on the melt to the wall of the mold. The magnetic field focuses the arc between electrode and melt, renders the arc uninfluenced by stray magnetic fields and spurious discharges, assists in preventing glow discharges at reduced pressures, and by creating a magnetic field barrier between the arcing surface of the electrode and the wall of the mold inhibits the arc from striking to the mold. Embodiments include magnetic field generating means mounted adjacent the wall of the mold, or adjacent the wall of a larger furnace enclosure, or on the electrode. A still further embodiment employs a rotating electrode with magnetic field generating means within the electrode.

MAGNETIC-FIELD ROTATING-ELECTRODE ELECTRIC ARC FURNACE APPARATUS AND METHODS

BACKGROUND OF THE INVENTION

1. Field of the Invention

The invention pertains to electric arc furnaces and to the solution of problems of arc control, and problems of homogeneous ingot formation with good grain structure.

2. Discussion of the Prior Art

It is old in the art to employ a fluid-cooled electrode in an electric arc furnace, as exemplified by U.S. Pat. Nos. 3,368,018; 3,369,067; 3,377,418; and 3,385,987, all assigned to the assignee of the instant invention. It is old in the art to produce in a furnace substantially continuous relative movement between an arc and an electrode, this having been disclosed in the copending application of A.M. Bruning, for "Electric Arc Heating and Melting," Ser. No. 866,275, filed Oct. 14, 1969, which application is a division of application Ser. No. 407,332 for "Electric Arc Furnace and Nonconsumable Electrode Suitable for Use Therein" filed Oct. 29, 1964, both of the afore-identified applications being assigned to the assignee of the instant invention.

Examples of electric arc furnaces employing rotating electrodes are U.S. Pat. No. 3,420,939 issued to M.P. Schlienger for "Arc Furnace Electrode Structure," and U.S. Pat. No. 3,461,214 issued to M.P. Schlienger for "Arc Wheel Electrode."

SUMMARY OF THE INVENTION

We have discovered that by utilizing a properly oriented magnetic field in conjunction with a rotating electrode in arc furnace apparatus, the arc is inhibited from striking to the wall of a mold containing the melt; the arc is focused between electrode and melt; glow discharge at reduced pressures is inhibited; skull and collar formation are inhibited; the arc is rendered relatively insensitive to stray magnetic fields; heating efficiency is improved; a more nearly homogeneous ingot is formed; an improved grain structure is obtained; the upper limit of feed rate of material is increased.

We have further discovered that by using a rotating electrode rotating in one angular direction, the electrode containing in the tip thereof magnetic field generating means for causing the arc to move substantially continuously around the arcing surface of the tip in the opposite angular direction, greatly increased speed of relative movement between arc and electrode is obtained with a corresponding reduction of erosion rate, and other advantages.

DESCRIPTION OF THE PREFERRED EMBODIMENTS

Figure 1:
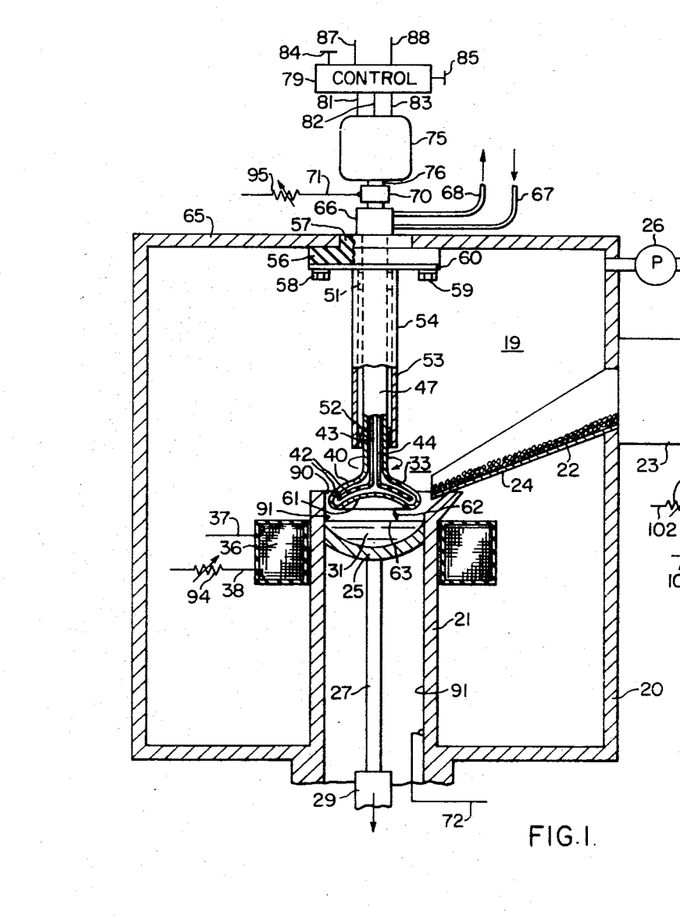
FIG. 1 is a view of furnace apparatus according to one embodiment of our invention and suitable for practicing the methods of our invention.

Particular reference is made to FIG. 1 wherein a furnace enclosure is generally designated 20 adapted to have a controlled atmosphere in the furnace chamber generally designated 19 and having a vacuum pump 26 communicating with chamber 19 for reducing the pressure therein if desired, to a predetermined value. Disposed substantially centrally within the furnace enclosure or housing 20 is a mold 21, which may be cylindrical, and which is adapted to have feed material 22 fed to the melt in the mold to form an ingot therein, feed material 22 being supplied from hopper 23 by way of feed-conveying means or chute 24. The mold has a retractable bottom 25 secured to shaft 27 which is moved by a suitable moving means 29 so that as material is fed to the melt 31, the bottom 25 may be retracted downwardly in the figure and the position of an electrode generally designated 33 remains substantially constant while maintaining a substantially uniform arc length between the arcing surface of the electrode and the level of the melt. Mold 21 is composed of material which does not provide too low a reluctance path, may be cylindrical in shape, and has mounted adjacent the outside wall thereof a magnetic field coil generally designated 36, the position of which may be axially adjustable along the wall of the mold, coil 36 having leads 37 and 38 to bring an energizing current thereto. It will be understood that leads 37 and 38 may be brought out through the wall of housing 20 in any convenient manner. Means, not shown for convenience of illustration, is provided for maintaining coil 36 in a selected axial position on the mold. Generally speaking, and in a manner to be described in greater detail hereinafter, magnetic field coil 36 sets up a magnetic field with lines of the magnetic field extending substantially axially through the mold and extending substantially axially between the surface of the melt 31 and the arcing surface of the electrode 33, and also extending in a generally axial direction through the space between the outer periphery of the disk-like portion 40 of the electrode and the inside wall of the mold.

As will be seen hereinafter and described more fully, magnetic field lines extending between electrode and melt focus the arc between the electrode and the melt. The arc path extending substantially parallel to the magnetic field lines, and the axially extending field lines through the annular space between the outer periphery of disk-like portion 40 and the inner wall 91 of mold 21 play a very important role in inhibiting the arc from striking to the wall of the mold since the arc would have to traverse the magnetic field lines, and the field lines exert a retarding force on possible arc extension in that direction. Further, magnetic field lines extending axially through the liquid portion of the ingot or through the molten portion of the melt have current filaments extending from the site of the arc spot on the melt, these filaments extending through the melt to the wall of the mold which is part of the current path. The magnetic field lines transverse to these current filaments exert a rotating force on the molten material and produce a stirring action which is essential to homogeneity of the ingot and good grain structure, and in addition this stirring action improves heat distribution from the arc to all portions of the melt, aids in consumption or dispersal of newly added feed material increasing the heating efficiency of the furnace.

The electrode generally designated 33 has an aforementioned disk or wheel portion 40 which is fluid cooled by a hollow conduit or hollow conduits 42 therein with conduit extensions 43 and 44 extending up through rotatable shaft portion 47 of the electrode, which shaft portion 47 is mounted for rotation in bearings 51 and 52 whereby rotation of the shaft 47 with respect to a fixed downwardly extending tubular member 54 is permitted. Member 54 may have flange portion 60 formed integrally therewith. An insulating support 56 has peripherally spaced bolts including bolts 58 and 59 passing therethrough which hold the tubular member 54 in position, the bolts passing into threaded bores in the top 65 of housing 20, these threaded bores not being shown for convenience of illustration. Support 56 has an insulating collar or axially extending flange portion 57 which extends through an aperture in furnace housing top or cover 65.

The surface of the electrode 33 on the side thereof toward the melt 31 is seen to be generally cup shaped, this surface of the electrode being designated 61, so that an arc 62 between the electrode and the surface 63 of melt 31 tends to take place near the outer periphery of the electrode and is discouraged from moving toward the inner portion of surface 61 because the distance of this inner portion of the surface from the melt surface 63 is greater and the arc path would be longer, the arc normally tending to follow the shortest path between surfaces of opposite polarity.

Device 66 shown in block form mounted adjacent the upper surface of top 65 of the furnace housing 20 has a fluid inlet and outlet 67 and 68 respectively for bringing fluid to and from the apparatus generally designated 66 and thence conducting fluid to and from the electrode by conduit extensions 43 and 44. The apparatus shown in block form at 66 may include two annular fluid headers communicating respectively with the inlet and outlet 67 and 68, these headers not being shown for convenience of illustration, and conduit extensions 43 and 44 may have short radially extending or curved portions within the device 66, these curved portions not being shown for convenience of illustration but which connect with or open into the aforementioned annular fluid headers whatever the instant angular positions of the conduit extensions 43 and 44 may be as the shaft portion 47 rotates within the sleeve 54.

There is shown at 70 a commutator or a slipring device, which may be of conventional construction, having lead 71 connected thereto for completing a current path from a terminal of one polarity of a source of potential to the electrode, the mold 21 as aforementioned being composed of nonferrous yet electrically conductive material having lead 72 connected thereto which is connected to the terminal of opposite polarity of the source of potential. It will be understood that the melt 31 is composed at least partially of electrically conductive material so that a current path is completed between leads 71 and 72 by way of the conductive electrode structure, the arc, the melt, and the mold 21.

In our invention the source of potential for supplying the arc current may be either direct current or alternating current.

There is shown at 75 a motor which may be of conventional design operatively connnected to the shaft 76 as by a gear box, not shown, which it is understood is operatively connected to the shaft portion 47 of the electrode, by means not shown for convenience of illustration, for rotating the electrode at a predetermined speed.

The device shown in block form at 79 connected to motor 75 by leads 81, 82 and 83 is a motor-reversing apparatus for automatically reversing the direction of rotation of the motor 75 if desired, at periods the length of which can be controlled by the control indicated at 85. Control 84 indicates means, which may be of conventional design, for cutting the motor reversing apparatus 79 out of the circuit when desired. Leads 87 and 88 are connected to a source of potential for driving the motor and actuating the motor-reversing mechanism. The motor-reversing feature may be eliminated if desired.

The general concept of a rotating or oscillating electrode, the direction of angular rotation of which is periodically reversed, forms no part of the instant invention.

In the operation of the apparatus of FIG. 1 illustrating our invention, magnetic field coil 36, which has the position thereof axially adjustable along the length of the mold, generates a magnetic field within the mold 21 with field lines extending through the mold in a direction substantially parallel to the axis of the mold. Some or all of these lines extend through the melt, may extend from the upper surface of the melt to the arcing surface 61 of the electrode, and may extend axially through the annular space 90 which exists between the outer perimeter or boundary of electrode 33 and the inside wall 91 of mold 21.

The field lines extending substantially axially through said annular space 90 play an important part in permitting the furnace to operate effectively and indeed in permitting the furnace to operate at all. The space between the outer periphery of electrode 33 and the inner wall 91 of the mold is so very small that the arc would tend to strike from the electrode to the wall of the mold rather than to the melt. This tendency to strike to the wall of the mold can result from a number of things, for example, stray magnetic fields from electrical leads bringing current to the apparatus. Another cause which tends to make the arc strike to the wall of the mold is gases given off by the material of the melt which have to pass through the narrow space between the electrode and the inside wall surface of the mold, these gases being conductive in some instances depending upon the material of the melt, and where conductive providing a conductive path between the electrode and the wall of the mold, and were not electrically conductive nevertheless tending to carry the arc with the gas flow whereby the arc is moved out of its intended position between the electrode and the melt and moved to a position where the arc takes place between the electrode and the wall of the mold. It is to be noted that a very large percentage of the upper surface of the melt is enclosed within or covered by the cup-shaped portion of the arcing surface; gases emitted from this melt region would pass through the arc path, and whether conductive or nonconductive would tend to carry the arc to a position where it took place from the side of the electrode and struck to the wall of the mold.

The aforementioned magnetic field generated by coil 36 is also most useful in focusing the arc between the electrode and the melt, the arc tending to follow in the lines of the magnetic field. This will result in a more diffused mode of arc operation, distributing heat flux more uniformly over the electrode surface and reducing erosion of material from the electrode.

The aforementioned magnetic field created by coil 36 is also most useful and perhaps absolutely essential to provide stirring of the melt if a homogeneous ingot with good grain structure is to be formed. As aforementioned current filaments from the site of the arc spot on the melt extend toward the wall of the mold and at least having a component transverse to the magnetic field lines with a resulting swirling force exerted on the molten part of the melt and a resulting stirring action. This swirling motion increases the rate at which feed material 22 is consumed or dispersed within the molten pool, increases the heating efficiency of the arc, provides for better mixing and a more nearly homogeneous ingot, and provides better grain structure where an ingot is formed by retracting the retractable bottom portion 25 of the mold.

Means for adjusting the value of the current in field coil 36 is symbolized by rheostat 94, and means for adjusting the value of the arc current is symbolized by rheostat 95.

It will be understood that the rheostat 94 may be mounted in any convenient position external to the furnace enclosure 20.

Our invention includes furnace apparatus in which the arcing surface rotates in a plane at an angle to the plane of the surface of the melt, and rotating electrode so mounted as to produce rotation in such an angular plane.

Figure 2:
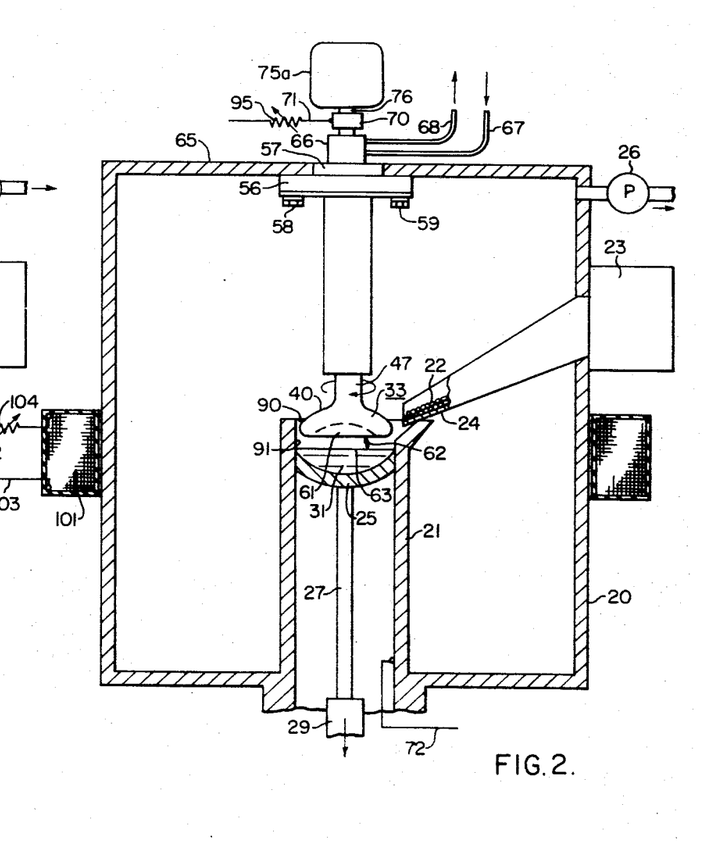
FIG. 2 is a view of an additional apparatus embodiment, also suitable for practicing our methods.

Particular reference is made now to FIG. 2 showing an additional embodiment of our invention. In FIG. 2 there is no field coil adjacent the mold; the magnetic field within the mold is generated by field coil 101 mounted external to the furnace enclosure or housing 20 which it is understood in this case it is also composed of substantially nonferromagnetic material. Leads 102 and 103 bring an energizing current to the field coil, and rheostat 104 symbolizes means for adjusting the value of the energizing current. Magnetic field lines generated by coil 101 extend in a substantially axial direction through the mold 21, through the melt, in the space between electrode and melt, and in the annular space 90 which exists between the outer perimeter of the electrode 33 and the inside wall 91 of the mold 21. It will be understood by those skilled in the art that because coil 101 is located a radial distance from the inside of the mold a much greater distance than coil 36, FIG. 1, that the ampere turns excitation of the coil 101 must be substantially greater than the ampere turns excitation of coil 36 if a magnetic field of the same flux density is to be produced within the mold and the other areas mentioned heretofore, except possibly in the case of a field coil having a very large L/D ration compared to that shown. Coil 101 may have its position axially adjustable along the vertical axis of the furnace housing 20, and may be secured in position by means, not shown for convenience of illustration. Our invention includes means, not shown for convenience of illustration, and which may be of conventional design, for adjusting the axial position of the field coil during a melting process without breaking the seal of the furnace.

The operation of the apparatus of FIG. 2 is similar to that of the apparatus shown in FIG. 1 and the magnetic field generated by coil 101 may be used for one or more of the aforementioned purposes, that is, preventing arc flare, inhibiting the arc from striking from the electrode to the wall of the mold, focusing the arc between electrode and melt, and stirring the melt.

The apparatus for reversing the direction of rotation of the shaft 70 by motor 75 is omitted in FIG. 2 for simplicity of illustration, but may be utilized if desired.

Statements made hereinbefore with reference to FIG. 1 regarding an electrode arcing surface rotating in a plane at an angle to the melt, apply also to FIG. 2 and are part of our invention.

Figure 3A:
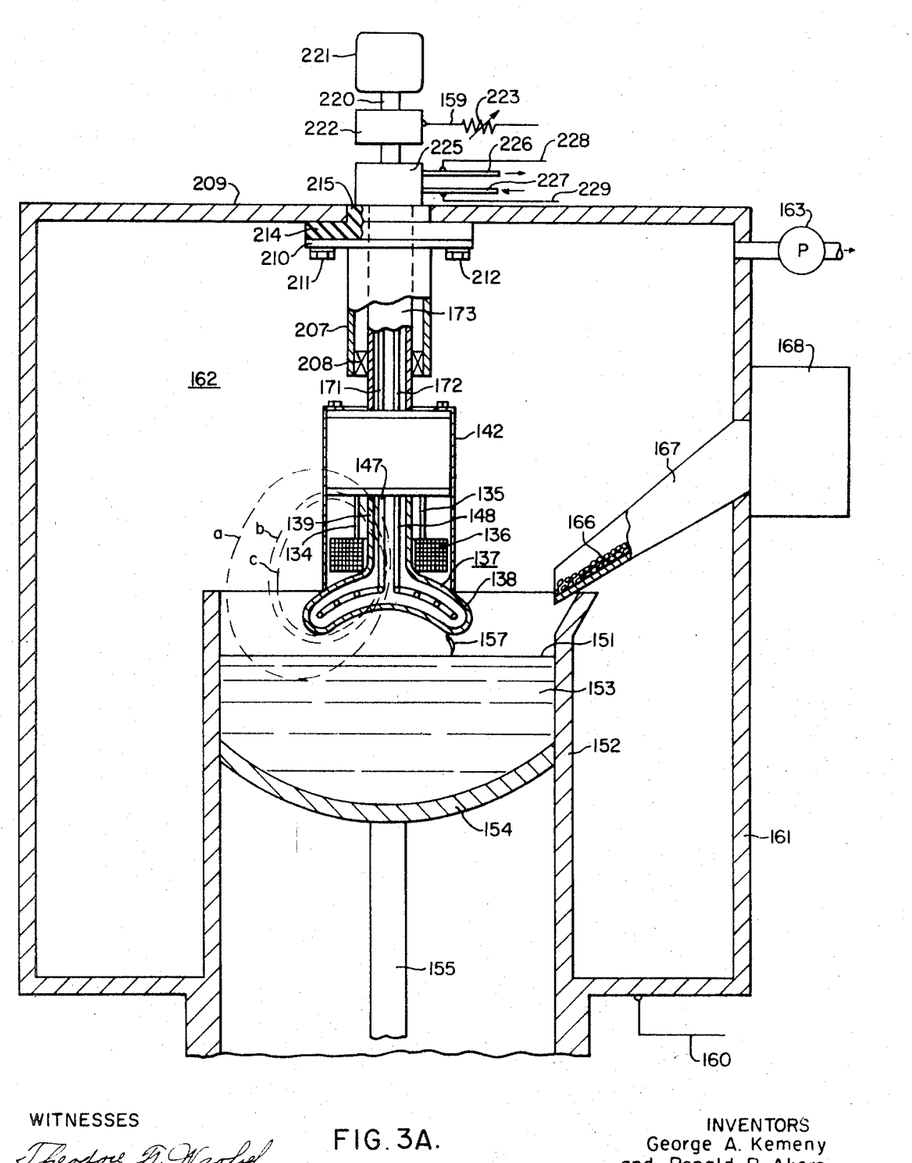
FIGS. 3A and 3B are views of a further apparatus embodiment, also suitable for practicing our methods.
Figure 3B:
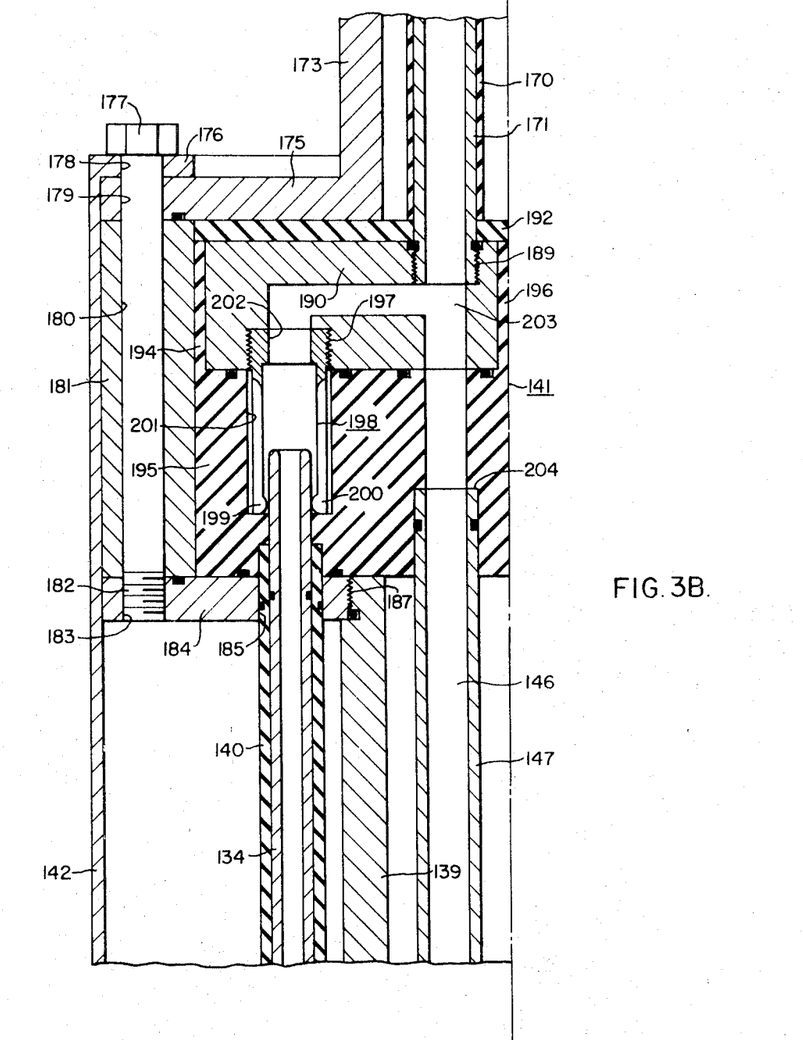

Particular reference is made now to FIGS. 3A and 3B which show a further embodiment of our invention. In the embodiment of FIGS. 3A—3B there is shown at 136 a magnetic field coil which is shown as being composed of turns of hollow conduit, and which has a cooling fluid flowing therethrough, the fluid being brought to and from the field coil 136 by means to be described hereinafter in greater detail, including conduit extensions 134 and 135 which also bring current for energizing the field coil 136. Conduit extensions 134 and 135 are connected to a fluid and current conducting assembly generally designated 141, FIG. 3B, the assembly 141 being enclosed within housing or heat shield 142, FIG. 3A, housing 142 being preferably cylindrical in shape, with the lower end thereof in close contact with the upper portion of electrode wheel 138. The electrode has a hollow shaft or column portion 139 to which the tip is secured and may be formed integrally therewith, and extending through the hollow column 139 are conduits 147 and 148 which are connected to or formed integrally with a coil of conduit 150 in the tip 138 for removing heat flux from the electrode tip.

The electrode generally designated 137 is shown as extending into a mold 152 having a melt 153 therein which it is understood is composed of at least partially electrically conductive material. Mold 152 is shown as having a retractable bottom 154 secured to retracting rod 155. An arc 157 is seen taking place between electrode 137 and the upper surface 151 of the melt 153. In a manner to be described in greater detail hereinafter, the arc is produced and sustained by connecting the electrode by way of lead 159 and the melt and mold which it is understood is composed of electrically conductive preferably nonferromagnetic material by way of a lead 160 to terminals of opposite polarity of a source of potential, it being understood that the source of potential which produces the arc may be direct current or alternating current.

A furnace housing 161 encloses the mold and the electrode and provides a sealable chamber 162 in which a controlled atmosphere may be maintained as by vacuum pump 163.

It will be understood that the electrode 137 and the conduits therein which carry a cooling fluid are preferably composed of nonferromagnetic material so as not to distort the magnetic field generated by the field coil 136.

Dashed lined a, b and c illustrate the magnetic field set up by coil 136, or possible intense flux paths. As will be understood by those skilled in the art, even though the coil is solenoidal, by varying the degree of excitation of the coil the magnetic field intensity at a selected point or a number of points defining an imaginary path may be varied to some degree. Where there is a strong magnetic field component in the region of dashed line a identifying one such path, this magnetic field inhibits an arc from striking from the electrode to the wall of the mold, since the arc would have to strike across the magnetic field lines. On the other hand, a magnetic field such as that indicated by dashed line c may have lines extending from the electrode arcing surface to the surface of the melt and may assist in focusing the arc. Furthermore, the field lines present in the vicinity of dashed line a extend to some depth in the melt 153, and assuming the melt is composed of nonferromagnetic material, or is above the Curie point of a ferromagnetic material, magnetic field lines in the path indicated by dashed lines a, since they extend into the melt, and since there are current filaments extending through the melt from the sight of the arc spot thereon to the wall of the mold 152, some beneficial stirring action may be produced by the stronger field indicated by dashed line a. This stirring action increases the rate of dispersal of material 166 which is added to the melt, with increased heating efficiency, a more nearly homogeneous ingot, and an improved grain structure. Material 166 is fed to the melt 153 by way of chute 167 from material hopper 168.

Particular reference is made to FIG. 3B, showing the assembly 141 in cross section, and recalling that the assembly 141 is located within the housing 142. In FIG. 3B, the wall of the housing is shown at 142 with the conduit extension 134 shown as enclosed within a sleeve of insulating material 140; the electrode column is seen at 139, which supports the tip as shown, FIG. 3A, and the conduit 147 for bringing cooling fluid to or from the tip is shown. Extending above the assembly 141 is the conduit or tube 171 which is shown enclosed in an insulating sleeve 170, and an additional portion of the electrode column is shown at 173, corresponding to 173 in FIG. 3A.

Paying particular attention to FIG. 3B, which it is understood shows only one-half of the assembly for simplicity of illustration, the other half not shown being symmetrical, the column portion 173 extending therefrom and the housing 142 is seen to have an inwardly extending annular lip portion 176 with peripherally spaced bolts, one of the bolts being shown at 177, extending through bore 178 in the flange portion 175, thence through bore 180 in an annular spacer member 181, the bolt 177 having a threaded end 182 in threaded engagement in a threaded bore 183 in a bottom supporting member 184. Member 184 has a bore or aperture 185 therein through which the aforementioned insulating sleeve 140 and conduit extension 134 pass, member 184 having a threaded central aperture 187 therein in threaded engagement with the upper end of the electrode column portion 139.

Upwardly extending tubular portion 171, which it is understood is composed of electrically conductive material, is in threaded engagement at the lower end thereof with the bore 189 in a member of conductive material 190 which is insulated from the flange portion 175 by the insulating plate 192 which extends along the top thereof, and which has an extended sleeve portion 194 of an electrically insulating member generally designated 195 disposed between member 190 and member 181 to electrically insulate the last-named two members from each other. The aforementioned sleeve of insulating material 170 which encloses conduit extension 171 extends downwardly to the upper surface of the insulating plate 192.

In threaded engagement in the bore 197 in member 190 there is a contact finger assembly generally designated 198, two of the spring contact fingers being shown at 199 and 200. The contact fingers, which extend around the entire periphery of the upper end of the conduit 134, make firm electrical connection therewith and it is seen that the contact fingers extend downwardly through a passageway or bore 201 in the insulating block 195. The open space of this bore 201 forms a fluid passageway which opens into or communicates with the passageway within the conduit, there being a central passageway 202 through the threaded portion of the contact finger assembly which opens into or communicates with the passageway 203 in the electrically conducting block 190, passageway 203 opening into or communicating with the passageway through the conduit or tube 171 which extends upward through the upwardly extending portion of the electrode column 173. Passageway 203 also has a portion which extends downwardly and opens into or communicates with the passageway 146 in the conduit extension 147, conduit 147 extending into block 195 and abutting against an annular shoulder 204.

Arc current takes a path through column 173, thence through flange 175, thence through member 181, thence through member 184, thence through the threaded connection at 187 to the lower column extension 139, and downwardly through 139.

Electrical current for the field coil takes a path through tubular member 171, thence through threaded joint 189 to member 190, thence through threaded joint 197 to the contact finger assembly 198, thence through the extension 134 and downwardly to field coil.

As previously stated, there is another conduit extension corresponding to 134, not shown for convenience of illustration, the other conduit extension having electrical connection made thereto by way of a similar contact finger assembly and having fluid conducted therefrom by way of a passageway corresponding to 203. The other conduit extension and other contact finger assembly are in the other half of the apparatus, not shown, which other half is symmetrical with the half shown. It is noted that block 195 has a portion 196 which together with insulating plate 192 electrically insulates the current paths from each other.

Particular reference is made again to FIG. 3A. The tube portion or column portion 173 is rotatable in upper and lower bearings in a downwardly extending fixed tube 207, one of the bearings being shown at 208. Tube 207 has a flange portion with peripherally spaced bolts, two of the bolts being shown at 211 and 212, the flange portion 210 being spaced from the top 209 of the furnace enclosure by an insulating member 214 which has an extended tubular portion 215 passing through an aperture in the top 209 of the furnace. Thereby the electrode column 173 and all the parts therein are electrically insulated from the furnace housing 161.

The column portion 173 is secured by means, not shown for convenience of illustration, to a shaft 220 operatively connected to motor 221 to be driven thereby. There is shown in block form at 222 a slipring or commutator device for making electrical connection to the shaft 220, the commutator or slipring device 222 having lead 159 thereto, the lead being adapted to be connected to a terminal of one polarity of a source of potential, rheostat 223 symbolizing means for adjusting the value of the arc current. Lead 160 connected to the furnace enclosure, or if desired connected directly to the wall of the mold 152, which it is understood is composed of electrically conductive material, is adapted to be connected to the terminal of opposite polarity of the source of potential to produce and sustain an arc 157 between the electrode generally designated 137 and the melt 153, which it is understood is composed of at least partially electrically conducting material.

The apparatus shown in block form at 225 may include annular fluid headers, not shown for convenience of illustration, opening into or communicating with fluid outlet and fluid inlet 226 and 227 respectively. The conduit extensions 171 and 172 may have at the upper ends thereof radially extending portions, not shown in FIG. 3A, which communicate with the aforementioned fluid inlet and outlet headers, whatever the instant angular position of the column 173 with respect to the fixed fluid channeling device 225. Leads 228 and 229 connected to outlet 226 and inlet 227 respectively symbolize means for bringing an energizing current to the field coil.

It will be understood that current paths to the field coil, as well as two fluid paths which jointly serve the field coil and the electrode, as well as a current path to the electrode, are provided in FIG. 3A. The portion of the apparatus of FIG. 4B above the line 3XA may be employed for this purpose.

Further describing the operation of the apparatus in FIGS. 3A and 3B, at least many of the possible advantages of an existing magnetic field within a mold to which an electric arc takes place are obtained. In vacuum 56 with nonconsumable electrodes generally, that is, electrodes of the type employing fluid cooling for removing heat flux from the arcing surface, and employing some means for moving the arc substantially continuously around the arcing surface to reduce erosion therefrom, it has been found in practice that unless a magnetic field is used in conjunction with the electrode, a satisfactory melting operation has been difficult if not impossible to obtain. Even assuming ideal conditions of operation existing temporarily or permanently, that is, operating conditions where the arc 157 attaches to one point on the surface of the melt, or remains in one general area of the surface of the melt by reason of stubs extending therefrom, by reason of a volume of relatively high conductivity material existing melting that particular portion of the melt as feed material is fed to the melt in that area and the material begins its dispersal in that general region, and assuming the ideal condition that there are no irregularities or pits in the arcing surface of the electrode existing by reason of erosion or arc action, so that while the electrode rotates the arc may be relatively stationary with respect to the melt while moving substantially continuously around the arcing surface, nevertheless the melting will still be inefficient and mold punctures may result.

By using a magnetic field coil of the proper strength, producing a magnetic field with field lines extending in the proper direction, inefficient melting and mold punctures may be avoided. Where as in FIGS. 1 and 2 the field has magnetic field lines extending substantially axially of the mold, the field lines focus the arc between the electrodes and the melt, overcoming external influences such as stray fields from the mold and electrode leads, blasts of ionized gas, and so forth, and under certain conditions set up and maintain a diffused discharge between the electrode and the melt. In this mode of operation, erosion of the electrode is at a minimum and the greatest portion of the melt is acted upon by the arc.

As previously stated, some departure from the axial orientation of the magnetic field lines may be desirable around the electrode to maintain still lower erosion, and such an effect is obtainable by the magnetic field coil or electromagnet 136 as indicated by the paths $a$, $b$ or $c$.

It is to be noted that the radial spacing between the inner wall of the mold and the outer perimeter of the electrode generally designated 137, FIG. 3A, is substantially greater than the spacing between the outer perimeter of the electrode 33 and the inner wall of the mold 21 in FIG. 1. This feature is desirable and perhaps essential because the lines of the magnetic field produced by electromagnet 136 converge through the center of the solenoid-shaped electromagnet, and allowance must be made for the normal magnetic field distribution of a solenoidal field producing device.

Referring again to FIGS. 1 and 2, the path of charge carriers in an electric arc and the resistance to motion of these charge carriers, is determined by the number of collisions experienced by the carrier in passing from one source of potential to another and the ionization level (i.e., number of charge carriers present). As more collisions are experienced by the charge carriers (or with a decrease in density of charge carriers) the greater the resistance to motion the arc experiences and the greater the potential gradient required for the charge carriers to travel a given distance. Therefore, in arcs at higher pressure levels, say atmospheric, an arc tends to take the shortest path between two points (i.e. from the electrode to the melt). However, as the pressure is reduced fewer collisions are experienced by the charge carriers and external influences can become more important, especially the action of magnetic fields. No energy is expended by virtue of a charge carrier which passes parallel to magnetic field lines, but energy is expended in direct proportion to the product of the particles' velocity and the strength of the magnetic field in crossing a magnetic field line. Therefore a charged particle will tend to follow the magnetic field lines. The actual path of the charge carrier will in general result from the balance between the last two described phenomenon. Naturally, if the number of collisions decrease the effect of a magnetic field and other effects become important. Therefore, by setting up axial magnetic field lines between the electrode and the melt, the arc discharge can generally be confined to operate in that region, greatly reducing the tendency of the arc to flare to the mold or to go into glow which requires it to cross magnetic field lines set up by the field coil. Only when influenced by large blasts of ionized gas, strong "stray" magnetic fields or physical shorting caused by conductive particles such as solid feed material, will the arc deviate from this desired mode of operation.

One "anomaly" of the vacuum melting furnace is the glow mode of operation, or more nearly technically correct, the "displaced skittering arc mode of operation," where the entire furnace layer in the arcing region is enveloped in the discharge. In nonconsumable melting this phenomena is usually caused by having such a long arc that the distance between the electrode and the melt is at least of the order of the distance between the electrode and the mold wall. This mode of operation is very undesirable since little if any melting occurs, and the power is dissipated over the entire furnace volume. This mode is greatly retarded if not eliminated by setting up a magnetic field pattern which requires the arc to cross magnetic field lines in reaching the mold wall. Therefore, a long arc length and/or a smaller mold can be used when an axial field is employed.

When feeding this material into a melt such as is done in nonconsumable melting, it is necessary to stir the melt so that as the material contacts the pool, mass transfer occurs which mixes the material into the melt in an efficient manner. If this is not done the material will merely remain on the melt, greatly reducing the rate at which material can be added and virtually preventing melting. This is especially true for lighter particles such as sponge and chips resulting from machinery. Stirring also affects the shape of the molten pool, giving a more nearly cylindrical shape compared to the more nearly parabolic shape generally obtained.

The desired manner of furnace operation is obtained in the apparatus of FIGS. 1 and 2 by effects heretofore described. Similar remarks apply to the apparatus of FIGS. 3A—3B.

The electrode may extend horizontally from the furnace wall or may be mounted at a sloping angle toward the mold, so that the arcing surface rotates in a plane at an angle to the surface of the melt.

Figure 4A:
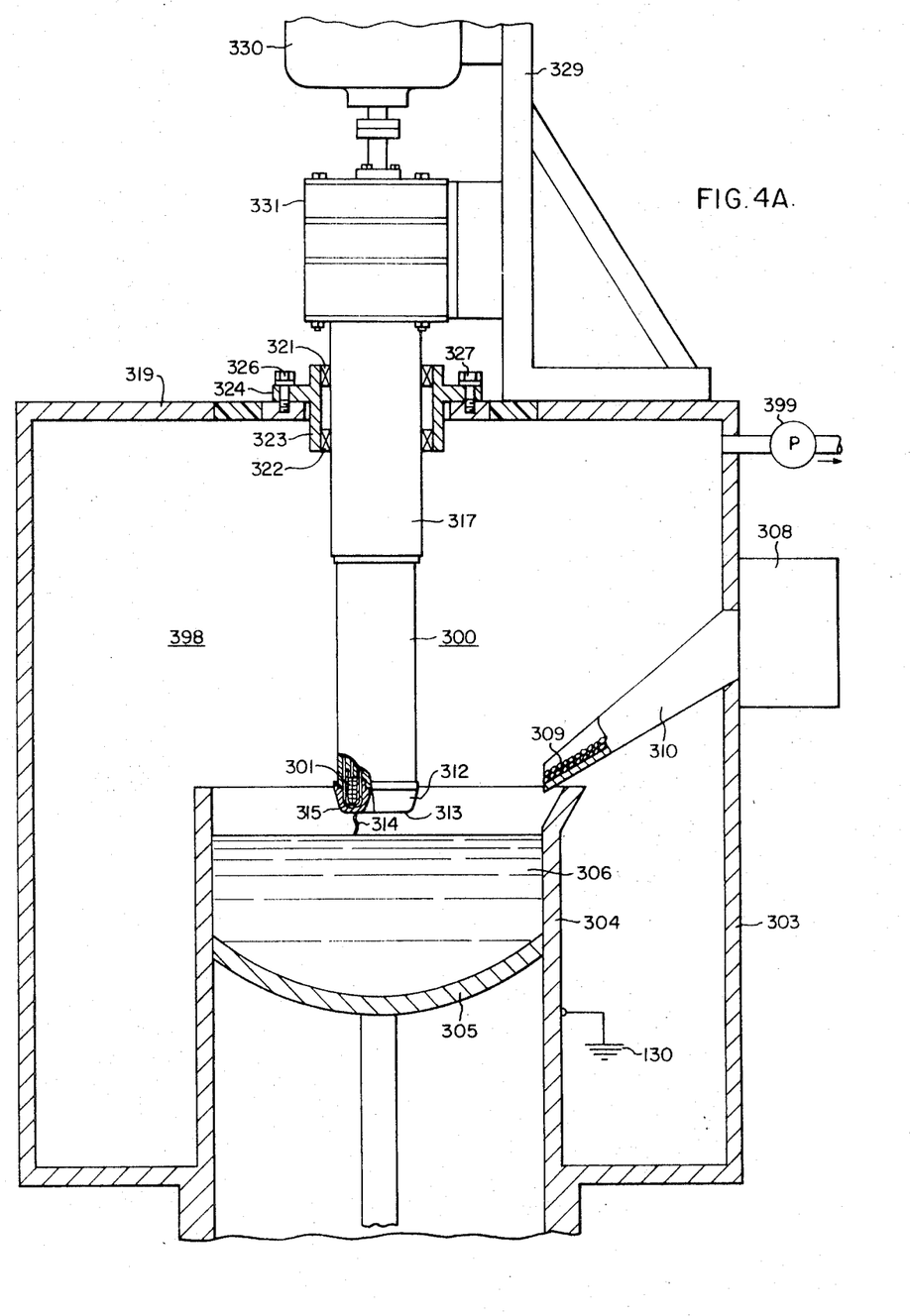
FIGS. 4A and 4B are views of still a further apparatus embodiment, suitable for practicing other methods of our invention.
Figure 4B:
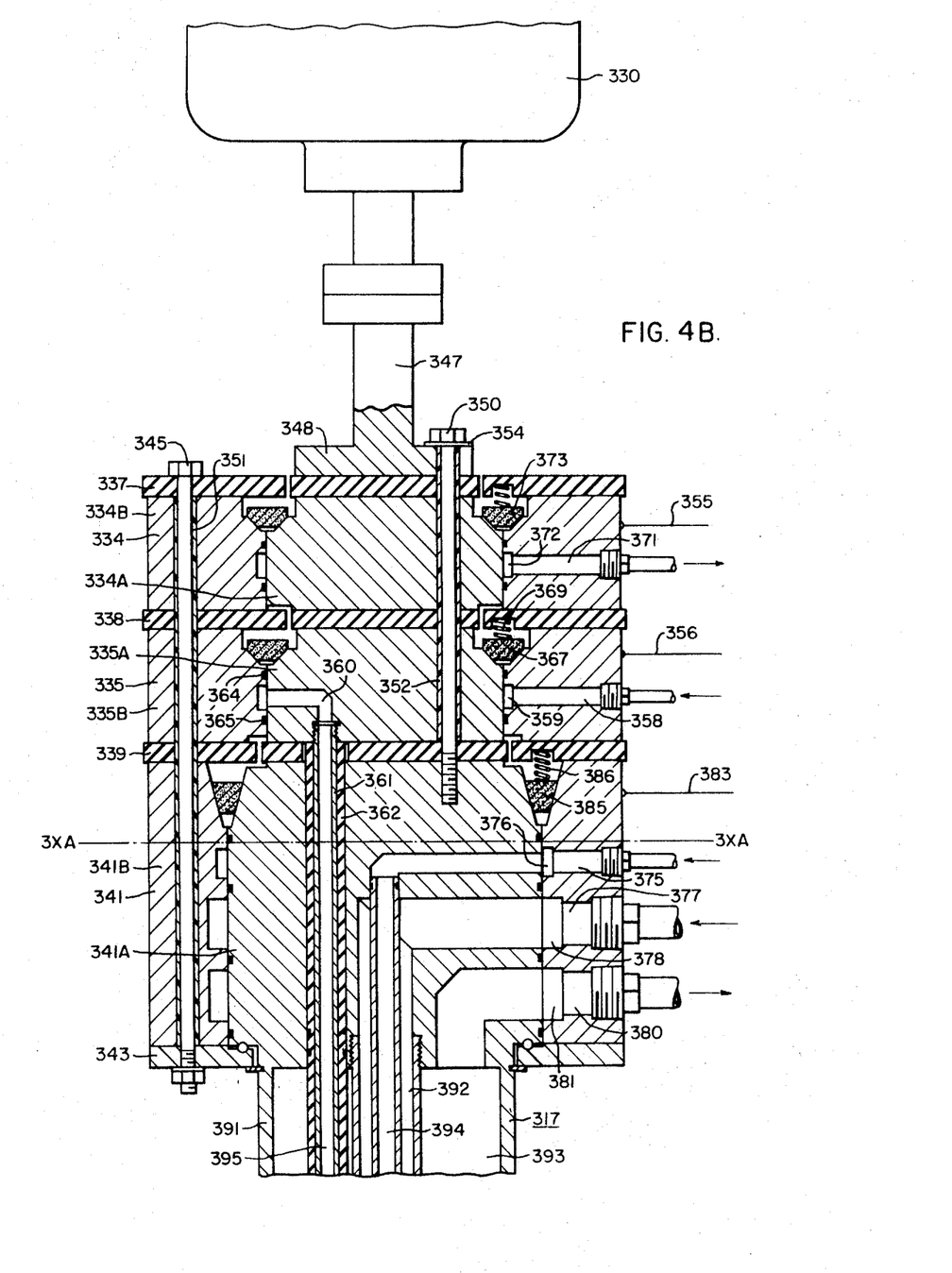

Particular reference is made now to FIGS. 4A and 4B showing a further and preferred embodiment of our invention, in which a rotating electrode is employed for heating material in a mold in a furnace, and in which an electrode in the general configuration of electrodes described in patents heretofore identified, in addition to rotating itself, has in the annular tip thereof a magnetic field coil for setting up a field which extends radially across the arcing surface around the entire periphery of the tip, the field having a component transverse to the arc path between the electrodes and the melt and exerting a moving force on the arc which causes the arc to rotate substantially continuously around the arcing surface. By having the electrode rotate in one angular direction and having the arc produced by direct current with the polarity of the magnetic field such that the arc is caused to rotate around the arcing surface in the opposite angular direction, the relative speed of arc movement on the arcing surface may be greatly increased, with improved operating advantages to be seen more clearly hereinafter.

The apparatus of FIGS. 4A—4B can of course be used where alternating current supplies the arc, but it will be understood by those skilled in the art that where the magnetic field in the tip is generated by direct current and the arc is produced by alternating current, the arc reverses its direction of rotation after each alternation as the instant polarity of the alternating current changes, but notwithstanding this, certain advantages accrue from the use of the apparatus shown in FIGS. 4A—4B where the arc is produced by alternating current.

In FIG. 4A a rotating electrode is generally designated 300. An electrode suitable for use at 300 is described and claimed in U.S. Pat. No. 3,480,717, issued Nov. 25, 1969 and assigned to the assignee of the instant invention, certain modifications of the upper portion of the electrode being required to provide fluid to, and conduct fluid from, the arcing surface for the purpose of conducting heat flux therefrom, and to provide fluid to and conduct fluid from the field coil or electromagnet shown at 301 which is shown as being composed of turns of hollow conduit in accordance with the teachings of U.S. Pat. No. 3,480,717. The coil need not be fluid cooled where conditions permit, and the apparatus of FIG. 4B accordingly simplified. Additionally, in the aforementioned patent there is a passageway extending through the electrode for bringing gas or other material to the tip of the electrode and introducing the material into the atmosphere in this region, or introducing the material into the melt, and further modification of the upper portion of the electrode of U.S. Pat. No. 3,480,717 is illustrated in FIG. 4B to provide in a rotatable electrode, conductive fluid inlet and outlet passageways to the field coil electrically insulated from each other, a current passageway to the tip, fluid inlet and outlet passageways to the tip, and a connection to the axially extending passageway through the electrode.

The subject matter of U.S. Pat. No. 3,480,717 is incorporated herein by reference.

A furnace enclosure is shown at 303 having a mold 304 therein with a retractable bottom 305 and a melt 306 which it is understood is composed at least partially of electrically conductive material. A hopper 308 contains feed material 309 which is supplied by chute 310 to the melt 306.

The aforementioned electrode 300 has an annular tip 312 providing an arcing surface 313 from which an arc 314 takes place to the melt. The tip is seen to have a generally U-shaped passageway, that is U-shaped in cross section and extending around the entire tip or electrode, the passageway being shown at 315, through which cooling fluid flows to conduct heat flux from the tip. The aforementioned magnetic field coil 301 is located within the tip in a space therein between the upwardly extending portions of the aforementioned U-shaped passageway.

Electrode 300 has a column portion 317 which extends through the top 319 of the furnace enclosure 303 and which is journaled for rotation in upper and lower bearings 321 and 322 of the bearing holder 323, bearing holder 323 having a flange portion 324 which is secured to the top 319 by peripherally spaced bolts, two of the bolts being shown at 326 and 327. Mounted on top 319 and secured to the top by means, not shown for convenience of illustration, is bracket 329 which supports a motor shown broken away at 330 for rotating the electrode, and also supports an assembly generally designated 331 in FIG. 4A, the assembly being shown in cross section in FIG. 4B.

Particular reference is made to FIG. 4B which as aforementioned shows the assembly 331 of FIG. 4A in cross section. The upper portion of the assembly is seen to include two manifold and commutator sections 334 and 335 for bringing fluid and electrical current to the fluid coil sections, 334 and 335 being located within insulating plates 337, 338 and 339. Beneath the plate 339 is a manifold and commutator section 341 for bringing cooling fluid to and from the electrode tip, for bringing arc current to the electrode tip, and also for bringing gas to the axially extending passageway through the center of the electrodes as described in U.S. Pat. No. 3,480,717. Manifold and commutator section 341 rests upon a further insulating plate 343. The insulating plates and manifold and commutator sections are held together by peripherally spaced bolts passing through aligned bores in the manifold and commutator sections and in the insulating plates, all of the bolts being encased by insulating sleeves, one of the bolts being shown at 345 encased in insulating sleeve 351.

Shaft 347 coupled to the motor as shown has the flange portion 348 secured to all of the rotating portions of the manifold and commutator sections by peripherally spaced volts which pass through aligned bores in plates 337, 338 and 339 and also in aligned bores in the rotating portions of the commutator sections, these portions being designated 334A, 335A and 341A, respectively. One of the bolts is shown at 350 having insulating sleeve 352 therearound, which passes through rotating sections 334A and 335A. Bolt 350 is insulated from flange 348 by insulating washer 354 and extends into the rotating portion 341A of the manifold and commutator block for the electrode and is in threaded engagement therein. Stationary portions of the manifold and commutator sections designated 334B and 335B respectively, are composed of electrically conductive material, and have leads 355 and 356 extending therefrom symbolizing means for connecting the field coil across the source of energizing potential.

With particular reference to manifold and commutator section 335 there is seen to be a fluid inlet 358 passing therethrough communicating with a fluid header 359 which extends around the entire stationary portion and opens into or communicates with a short L-shaped fluid passageway 360 which extends radially a short distance through the rotating portion 335A and thence extends downwardly a short distance to open into or connect with conduit extension 361 which is enclosed in insulating sleeve 362. A suitable O-ring seal is provided by O-rings 364 and 365 seated in annular grooves.

Good electrical connection between the stationary portion 335B and the rotating portion 335A is provided by a commutator ring-shaped brush 367 which is held in firm contact with slanting surfaces of both the rotating portion and the stationary portion by, if desired, peripherally spaced springs, one of the springs being shown at 369.

The manifold and commutator section 334 is similar to section 335 having a fluid outlet 371 communicating with the fluid header 372. Ring-shaped brush 373 provides good electrical connection between the rotating and stationary sections. It will be understood that the rotating portion 334A has therein in a plane other than the one selected for illustration an additional L-shaped passageway corresponding to passageway 360, which additional passageway communicates with the fluid header 372 at all times, the additional passageway of portion 334A communicating with an additional conduit extension enclosed by an insulating sleeve, not shown, which extend up through the electrode, up through plate 339, section 335A, through plate 338 and thence opens into the aforementioned L-shaped passageway in portion 334A, not shown.

The aforementioned manifold and commutator section for the arc current, for bringing cooling fluid to and from the electrode and for bringing a fluid or gas to the central passageway of the electrode for exhausting the gas or fluid at the electrode tip has the gas inlet 375, the gas inlet communicating with gas header 376. A fluid inlet is shown at 377 communicating with fluid header 378, and a fluid outlet 380 communicates with header 381. Lead 383 is connected to stationary section 341B symbolizes means for bringing arc current to the electrode, and the ring-shaped commutator brush 385 is held in firm electrical contact with stationary portion 341B and rotating portion 341A by peripherally spaced springs including spring 386 shown. As in the case of the manifold and commutator sections 334 and 335, O-rings are seated in annular grooves between the various fluid headers, above the uppermost fluid header and below the lowermost fluid header and provide fluid tight seals between the rotating portion and the stationary portion. In the electrode, column generally designated 317 has an outer wall 391; cooling fluid flows to the electrode through passageway 392 and from the electrode through passageway 393; gas flows through the passageway 394, and fluid to the field coil flows through the passageway 395. As aforementioned, the passageway for conducting fluid from the coil is not located in the plane of the cross section.

FIG. 1B of the patent drawings in the aforementioned U.S. Pat. No. 3,480,717 has two lines extending thereacross indicating a break in the continuity of the electrode. The lower portion of the apparatus as seen in FIG. 4B herein may be a continuation of FIG. 1B of the patent, the structure of FIG. 4B replacing everything above the broken lines in FIG. 1B and replacing all of the apparatus of FIGS. 1A and FIG. 2 of the patent.

The manifolding and commutator apparatus of FIG. 4B may be applied with slight modification apparent to one skilled in the art to the structure of FIGS. 3A—3B utilizing the portion of the apparatus shown in FIG. 4B above an imaginary line 3XA-3XA drawn horizontally across FIG. 4B beneath the O-rings immediately underneath the ring-shaped commutator brush 385, in which case the fluid headers 372 and 359 would supply fluid to the electrode conduit extensions shown at 171 and 172, FIG. 3A.

The embodiment of FIGS. 4A—4B is especially valuable where arc current is very large, or where the melt 306 gives off vapors which may become deposited on the arcing surface of the electrode. The magnetic field generated by coil 301 has a strong component extending radially across the arcing surface around the entire periphery thereof said component being transverse to the arc path and exerting a force on the arc which causes the arc to move substantially continuously in a rotary path around the arcing surface of the electrode. As aforementioned, where alternating current supplies the arc, the arc reverses its direction of rotation once per alternation.

Optimum advantages offered by the embodiment of FIG. 4 may be obtained by using direct current as a source of arc current, lead 383 being connected to a terminal of one polarity of the direct current source, the other terminal of opposite polarity of the direct current source being if desired grounded at 130, or the furnace housing 303 and mold 304 may be "floating." Where direct current supplies the arc, and direct current energizes the field coil 301, the magnetic field produced by 301 may cause the arc to rotate in one angular direction, whereas the electrode may be rotated in the opposite angular direction, and the speed of arc movement relative to the arcing surface greatly increased, reducing the erosion of material from the arcing surface. Whereas a vacuum pump 399 is shown for producing a controlled atmosphere in the furnace chamber 398, the embodiment of FIG. 4A has very significant advantages when the furnace is operated at atmospheric pressure and there is slight tendency for the arc to go into a diffused mode of operation. When the arc is constricted, the intensely hot arc spot produces some melting of the material of the arcing surface, substantial material being lost from the arcing surface only if the melted material evaporates before cooling. The increased speed of arc movement relative to the arcing surface reduces the amount of material evaporated from the electrode.

Further summarizing the features of the embodiment of FIGS. 1 to 3B wherein a magnetic field extends axially through the mold, into the space between the surface of the mold and the arcing surface, and in the space adjacent the electrode tip, and the space between the electrode tip and the wall of the mold, the use of the magnetic field can accomplish, generally speaking, six desirable and in some cases essentially tasks: (a) the arc can be utilized to burn away a collar which begins to form within the mold near the surface of the melt; (b) the field can be utilized to inhibit arc flare or arc striking to the wall of the mold by creating magnetic field lines which would have to be traversed by the arc in order to reach the wall of the mold; (c) the magnetic field may be used to inhibit undesirable glow discharges of the arc; (d) the magnetic field may be used to made the arc relatively unresponsive to stray magnetic fields produced by conductors and other means within the furnace; (e) the arc can be used to more quickly heat the feed material fed to the melt, resulting in quicker dispersion and improved heating efficiency and a more nearly homogeneous ingot; (f) the magnetic field may be used for focusing the arc between the electrode and the melt and creating a more diffused discharge; and (g) the magnetic field reacting with current filaments having components extending from the arc site on the surface of the melt may exert forces which cause a swirling, vortex or mixing motion in the melt, with improved heating efficiency and a better grain structure.

The commutator 331 and motor 330 sections are movably attached to structure 329, and moving means, not shown for purposes of illustration, is provided such that the electrode 312 can be raised above the mold 304 to allow the adding of large pieces of scrap, correcting the arc gap, of for any desired purpose, the movement being controlled by techniques known to those skilled in the art, journals 321 and 322 being slidably in contact with column 317.

It is also understood that any of the electrode apparatus described in FIGS. 1 through 4 can be used with stationary molds or skull molds as a part of this invention if desired to accomplish the desired result.

It is understood that more standard commutation means as known to those skilled in the art could also be used to bring power to the electrode and field coils embodied in these inventions.

It is seen then that for proper operation, assuming the best possible condition which is that the arc attaches to a stub, or attaches at a point on the surface of the melt, and the arc spot moves on the rotating arcing surface, a field within that portion of the volume of the furnace encompassing the electrode, the space between the electrode and the melt, and if possible extending into the melt is desirable for satisfactory furnace operation.

Suitable rotating and stationary sealing means are provided in all of the furnace embodiments for maintaining the desired pressures within the furnace chambers.

Whereas we have shown and described our invention with respect to certain embodiments thereof employing magnetic field coils, it will be understood that essentially the coils are electromagnets for producing the aforementioned field.

We claim as our invention:

1. In electric arc furnace apparatus in combination, a mold adapted to have at least partially electrically conductive material fed thereto, a rotatable electrode having a supporting column mounted in predetermined position with respect to the mold, the electrode having a generally disc-shaped tip forming an arcing surface, the tip lying in a predetermined plane with respect to the surface of a melt in the mold, the material and the electrode being adapted to be connected to terminals of opposite polarity of a source of potential to produce and sustain an arc between the electrode and the material to be melted, and means mounted adjacent the wall of the mold for generating a magnetic field with field lines extending generally axially through the mold.

2. Apparatus according to claim 1 in which the mold is composed of electrically conductive material and in which the magnetic field generating means is so positioned axially of the mold that a strong magnetic field exists in the space between the disc-shaped arcing surface and the surface of the melt, and throughout the space existing radially between the periphery of the tip and the inside wall of the mold, said magnetic field focusing the arc between tip and melt and inhibiting the arc from striking from the tip to the wall of the mold.

3. Apparatus according to claim 1 in which the mold is composed of electrically conductive material and forms a part of the arc current path, and in which the means for generating the magnetic field is so positioned along the axis of the mold that the magnetic field produced thereby exerts a force on current filaments in the melt having components extending from the site of the arc spot on the melt to the wall of the mold and produces a swirling and vortex motion in at least a portion of the melt.

4. Apparatus according to claim 1 in which the magnetic field generating means is so positioned axially along the mold that field lines extend from the surface of the melt to the electrode, focusing the arc between electrode and melt.

5. Apparatus according to claim 1 in which the disc-shaped tip lies in a plane substantially parallel to the surface of the melt and the tip is spaced from the melt, in which the mold is composed of conductive material, and in which the magnetic field generating means is so positioned axially along the mold that field lines extend substantially parallel to the axis of the mold through the annular space between the outer periphery of the electrode tip and the inside wall of the mold, field lines in this space tending to prevent the arc from striking across the field lines and forming an arc path between the electrode and the mold.

6. Apparatus according to claim 4 in which the atmosphere in the furnace apparatus is adapted to be controlled including a reduced pressure therein, the furnace apparatus including vacuum pump means for producing and maintaining said reduced pressure, field lines extending between electrode and melt focusing the arc, assisting in preventing the arc from going into glow, and tending to cause the arc between electrode and melt to go into a more diffused mode of operation.

7. Apparatus according to claim 1 additionally characterized as having means for feeding material continually or intermittently to the melt, and the magnetic field generated by the field generating means is so positioned and so shaped that it assists in stirring the melt and speeds consumption and dispersal of the fed material.

8. Apparatus according to claim 1 in which the mold is composed of electrically conductive material and forms a part of the current path, and in which the magnetic field generating means has an axially adjustable position along the mold, and the position thereof is selected to perform at least one of the functions of stirring the melt, focusing the arc between arcing surface and melt, and inhibiting arc flare to the wall of the mold.

9. Furnace apparatus comprising in combination, a furnace enclosure including a mold composed of conductive material and adapted to have at least partially electrically conductive material deposited therein to be melted, an electrode mounted in the furnace enclosure over the melt in the mold, the electrode including a rotating wheel forming an arcing surface positioned horizontally over the melt so that the periphery of the wheel is substantially equally spaced at a predetermined distance from the melt around the circumference of the wheel, the electrode and the mold being adapted to be connected to terminals of opposite polarity of a source of potential to produce and sustain an arc between the electrode wheel and the melt, and means mounted adjacent one of the walls of the mold and furnace enclosure for generating a magnetic field with field lines extending generally axially for at least a portion of the distance through the mold, the magnetic field giving improved furnace performance by performing at least one of the functions of controlling the arc and providing stirring of the melt.

10. Apparatus according to claim 9 additionally characterized as being adapted to maintain a controlled atmosphere in the furnace enclosure, and vacuum pump apparatus operatively connected to the furnace enclosure.

11. Apparatus according to claim 9 in which the magnetic field generating means is so positioned axially along a wall in accordance with the level of the melt in the mold that the field lines extending transverse to current filament components in the melt exert a stirring force on the molten portion of the melt and cause rotation of the molten portion.

12. In electric arc furnace apparatus, in combination, means forming a furnace enclosure, a mold within the furnace enclosure in predetermined position therein, the mold being adapted to have at least partially electrically conductive material fed thereto, a rotatable electrode having a supporting column mounted in predetermined position with respect to the mold, the electrode having a generally disk-shaped tip forming an arcing surface, the tip lying in a predetermined plane with respect to the surface of a melt in the mold, the material and the electrode being adapted to be connected to terminals of opposite polarity of a source of potential to produce and sustain an arc between the electrode and the material to be melted, and means mounted adjacent the wall of the enclosure forming means for generating a magnetic field with field lines extending generally axially through the mold.

13. Apparatus according to claim 12 in which the disk-shaped top is a rotating wheel positioned horizontally over the mold.

14. Furnace apparatus including means forming a furnace enclosure and a mold adapted to receive at least partially electrically conductive material to be melted, an electrode mounted in the furnace enclosure in predetermined position with respect to the mold, the electrode including a rotating electrode wheel forming an arcing surface and lying in a predetermined plane with respect to the surface of the melt, means for producing an arc between electrode and melt, and magnetic field generating means mounted on top of the rotating electrode wheel, the field generated thereby performing at least one of the functions of assisting in producing relative movement between the electrode and the arc and producing focusing of the arc.

15. Electric arc furnace apparatus including a mold adapted to contain at least partially electrically conductive material to be melted, a rotatable electrode mounted in predetermined position with respect to the mold, the electrode including a fluid cooled annular tip forming an arcing surface, and a magnetic field coil mounted in the tip, the magnetic field coil in the tip generating a magnetic field which extends in a radial direction across the tip substantially parallel to the arcing surface in substantially uniform strength around the entire periphery of the tip, the electrode and melt being adapted to be connected to terminals of opposite polarity of a source of potential to produce an arc between electrode and melt, the magnetic field extending substantially transverse to the arc path and exerting a force on the arc which causes it to move substantially continuously around the arcing surface of the tip in a predetermined angular direction, and means operatively connected to the electrode for rotating the electrode in a predetermined angular direction.

16. Apparatus according to claim 15 in which the arc is produced by direct current and the magnetic field coil is energized by direct current, in which the arc rotates in one angular direction and the electrode rotates in the opposite angular direction the constant rotation of the arc in one angular direction by the field coil and the constant rotation of the electrode in the opposite angular direction producing a sustained increase in the speed of movement of the arc relative to the arcing surface of the tip.

17. Apparatus according to claim 15 in which the electrode is so mounted that the plane of the arcing surface lies at an angle to the surface of the melt.

18. Apparatus according to claim 17 in which the field coil is energized by direct current and the arc is produced by alternating current.

19. The method of operating an electric arc furnace including producing an arc from a rotating electrode to a melt and generating in the arcing zone a magnetic field produced by field generating means mounted on top of that portion of the electrode which forms an arcing surface.

20. The method of operating an electric arc furnace which includes producing an arc from an electrode rotating in one direction while generating a magnetic field by means within the electrode which exerts a force on the arc which causes the arc to rotate around the arcing surface of the electrode in a direction opposite to the direction of rotation of the electrode.

21. The method of operating an electric arc furnace which includes producing substantially continuous relative motion between an arc and a rotatable electrode and generating in the arcing zone a magnetic field produced by field generating means independent of the electrode.

22. The method of operating an electric arc furnace including the steps of forming an arc from a rotating electrode to a melt composed of at least partially electrically conductive material, and generating a magnetic field with field lines extending from electrode to melt and focusing the arc, and other field lines extending through the space around the periphery of the electrode and inhibiting the arc from stricking through said space.